US012789632B2

(12) United States Patent
Hosoyama et al.

(10) Patent No.: US 12,789,632 B2
(45) Date of Patent: Nov. 10, 2026

(54) VEHICLE CONTROL APPARATUS

(71) Applicant: SUBARU CORPORATION, Tokyo (JP)

(72) Inventors: Kazuya Hosoyama, Tokyo (JP); Ryota Morisawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 7 days.

(21) Appl. No.: 19/262,312

(22) Filed: Jul. 8, 2025

(65) Prior Publication Data

US 2026/0021706 A1 Jan. 22, 2026

(30) Foreign Application Priority Data

Jul. 16, 2024 (JP) ................................ 2024-113180

(51) Int. Cl.
*B60L 3/10* (2006.01)
*B60L 15/20* (2006.01)

(52) U.S. Cl.
CPC ........... *B60L 3/106* (2013.01); *B60L 15/2036* (2013.01); *B60L 2240/24* (2013.01); *B60L 2240/423* (2013.01); *B60L 2240/64* (2013.01)

(58) Field of Classification Search
CPC .. B60L 3/106; B60L 15/2036; B60L 2240/24; B60L 2240/423; B60L 2240/64
See application file for complete search history.

(56) References Cited

U.S. PATENT DOCUMENTS

2002/0167156 A1* 11/2002 Akutagawa ............. B60L 15/20 280/757

FOREIGN PATENT DOCUMENTS

| | | | | |
|---|---|---|---|---|
| JP | 2010074947 | A | * | 4/2010 |
| JP | 2011205799 | A | * | 10/2011 |
| WO | 02/00463 | A1 | | 1/2002 |

* cited by examiner

*Primary Examiner* — Aryan E Weisenfeld
*Assistant Examiner* — Jeffrey R Chalhoub
(74) *Attorney, Agent, or Firm* — TROUTMAN PEPPER LOCKE LLP

(57) ABSTRACT

A vehicle control apparatus configured to control a vehicle including four wheels and four motors provided to the respective four wheels. The vehicle control apparatus includes a control processor. The control processor is configured to: acquire target torques of the respective wheels by adding fluctuation torques of the respective wheels to requested torques of the respective wheels, the fluctuation torques each fluctuating cyclically, the requested torques corresponding to an accelerator operation amount; perform torque control of the motors, based on the target torques of the respective wheels; and when detecting that the vehicle is making a turn, set a first gain of each of the fluctuation torques to be applied to respective outer-wheel motors out of the four motors to a higher value than a second gain of each of the fluctuation torques to be applied to respective inner-wheel motors out of the four motors.

8 Claims, 9 Drawing Sheets

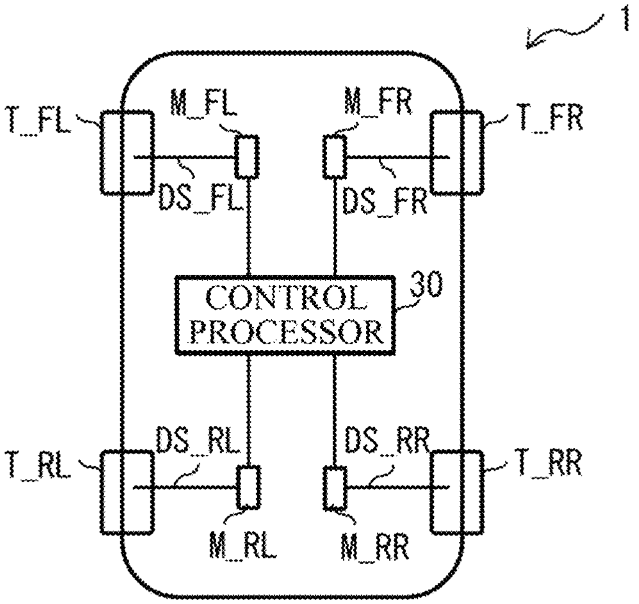
FIG. 3
FIG. 4A
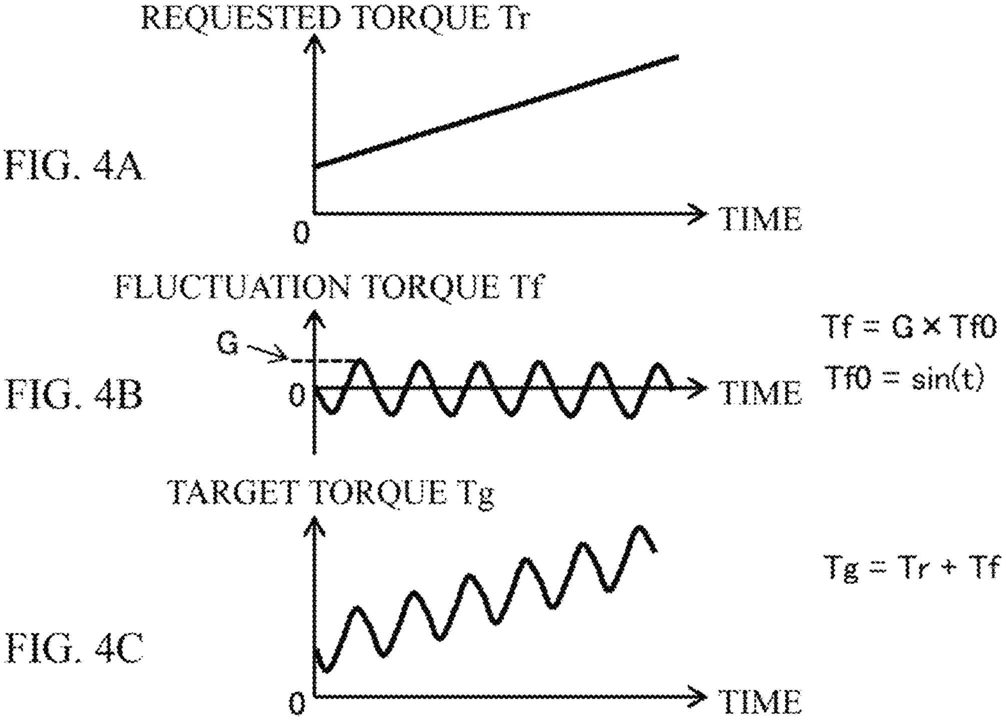
FIG. 4B
FIG. 4C

VEHICLE CONTROL APPARATUS

CROSS-REFERENCE TO RELATED APPLICATIONS

The present application claims priority from Japanese Patent Application No. 2024-113180 filed on Jul. 16, 2024, the entire contents of which are hereby incorporated by reference.

BACKGROUND

The disclosure relates to a vehicle control apparatus to be mounted in a vehicle.

Various techniques have been proposed to operate a vehicle more safely. For example, reference is made to Japanese Unexamined Patent Application Publication (JP-A) Nos. 2010-074947 and 2011-205799, and International Publication No. WO 2002/000463.

SUMMARY

An aspect of the disclosure provides a vehicle control apparatus configured to control a vehicle. The vehicle includes four wheels, and four motors provided to the respective four wheels. The vehicle is configured to travel by independently driving the motors. The vehicle control apparatus includes a control processor. The control processor is configured to: acquire target torques of the respective wheels by adding fluctuation torques of the respective wheels to requested torques of the respective wheels, the fluctuation torques each fluctuating cyclically, the requested torques corresponding to an accelerator operation amount; perform torque control of the motors, based on the target torques of the respective wheels; and when detecting that the vehicle is making a turn, set a first gain of each of the fluctuation torques to be applied to respective outer-wheel motors out of the four motors to a higher value than a second gain of each of the fluctuation torques to be applied to respective inner-wheel motors out of the four motors.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 3 is a diagram illustrating a modification example of the arrangement of the four wheels and the four motors of the vehicle illustrated in FIG. 2.

FIG. 4A is a graph illustrating an exemplary waveform of a requested torque for the vehicle illustrated in FIGS. 1 and 2.

FIG. 4B is a graph illustrating an exemplary waveform of a fluctuation torque for the vehicle illustrated in FIGS. 1 and 2.

FIG. 4C is a graph illustrating an exemplary waveform of a target torque corresponding to the requested torque illustrated in FIG. 4A and the fluctuation torque illustrated in FIG. 4B.

DETAILED DESCRIPTION

Figure 1:
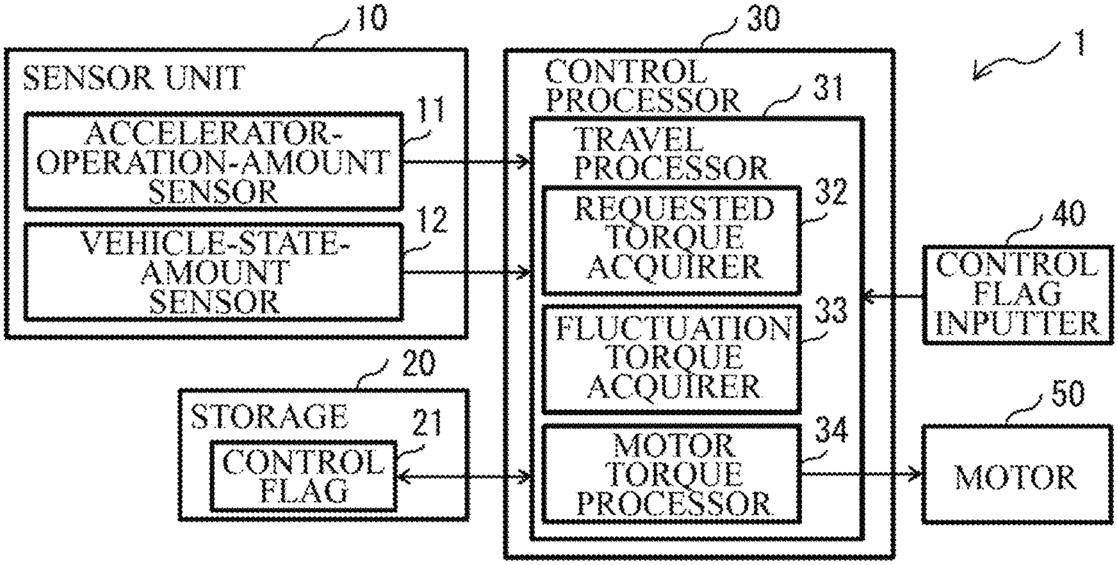
FIG. 1 is a block diagram illustrating an exemplary configuration of a vehicle according to one example embodiment of the disclosure.

A vehicle that travels by driving a motor has a motor output that is smoother than an engine output. This provides a smooth operation feeling in all traveling states including straight traveling, travel lane changing, and curve traveling. While obtaining such an operation feeling, however, a driver who drives the vehicle receives a small amount of information from the vehicle (i.e., driver information). When traveling on a low-friction-coefficient road (a low-μ road) such as a wet road, a snowy road, or an icy road, the vehicle decreases in grip and thus provides the driver with a smaller amount of the driver information than when traveling on a dry road. The driver thus has difficulties in perceiving a condition of a road surface and grip of the vehicle. As a result, the vehicle easily exceeds a grip limit of tires to slip, resulting in spinning and understeer of the vehicle.

To address these concerns, techniques disclosed in JP-A Nos. 2010-074947 and 2011-205799 and International Publication No. WO 2002/000463 involve acquiring a target torque by adding a fluctuation torque that fluctuates cyclically to a requested torque corresponding to an acceleration rate request, and performing torque control of a motor, based on the acquired target torque, with the aim of improving the driver information. In these techniques, however, a request for such torque control differs depending on the traveling state. For example, in the curve traveling, the vehicle exhibits a behavior greatly different from that in the straight traveling. Accordingly, the torque control that copes with the curve traveling is desired. It is desirable to provide a vehicle control apparatus that makes it possible to perform torque control that copes with curve traveling.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Exemplary configurations of a control processor 30 and a vehicle 1 according to an example embodiment of the disclosure will now be described. FIG. 1 is a block diagram illustrating the exemplary configuration of the vehicle 1 according to the present example embodiment. The vehicle 1 is configured to travel by independently driving four motors provided to respective four steered wheels. In the example illustrated in FIG. 1, the vehicle 1 may include a sensor unit 10, a storage 20, the control processor 30, a control flag inputter 40, and a motor 50. In one embodiment, the control processor 30 may serve as a "vehicle control apparatus" and a "control processor".

Figure 2:
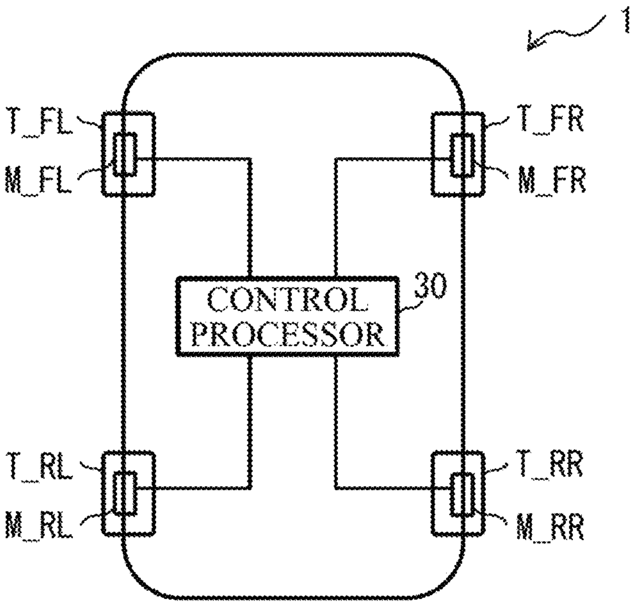
FIG. 2 is a diagram illustrating an exemplary arrangement of four wheels and four motors of the vehicle illustrated in FIG. 1.

The motor 50 may be configured to drive the steered wheels of the vehicle 1. The motor 50 may be configured to independently drive the steered wheels of the vehicle 1 in accordance with target torques Tg of the respective steered wheels received from a motor torque processor 34 to be described later. The vehicle 1 may be provided with the four steered wheels. Referring to FIG. 2, the four steered wheels of the vehicle 1 may include two front wheels including a left-front wheel T_FL and a right-front wheel T_FR and two rear wheels including a left-rear wheel T_RL and a right-rear wheel T_RR. The motor 50 may include a left-front-wheel motor M_FL provided to the left-front wheel T_FL, a right-front-wheel motor M_FR provided to the right-front wheel T_FR, a left-rear-wheel motor M_RL provided to the left-rear wheel T_RL, and a right-rear-wheel motor M_RR provided to the right-rear wheel T_RR. Hereinafter, the left-front-wheel motor M_FL, the right-front-wheel motor M_FR, the left-rear-wheel motor M_RL, and the right-rear-wheel motor M_RR may be collectively referred to as motors M, and the left-front wheel T_FL, the right-front wheel T_FR, the left-rear wheel T_RL, and the right-rear wheel T_RR may be collectively referred to as wheels T.

In the example illustrated in FIG. 2, the left-front-wheel motor M_FL, the right-front-wheel motor M_FR, the left-rear-wheel motor M_RL, and the right-rear-wheel motor M_RR may be respective in-wheel motors provided inside the left-front wheel T_FL, the right-front wheel T_FR, the left-rear wheel T_RL, and the right-rear wheel T_RR. In some embodiments, the left-front-wheel motor M_FL, the right-front-wheel motor M_FR, the left-rear-wheel motor M_RL, and the right-rear-wheel motor M_RR may be respectively a motor coupled to the left-front wheel T_FL via a drive shaft DS_FL, a motor coupled to the right-front wheel T_FR via a drive shaft DS FR, a motor coupled to the left-rear wheel T_RL via a drive shaft DS_RL, and a motor coupled to the right-rear wheel T_RR via a drive shaft DS_RR, as illustrated in FIG. 3.

The sensor unit 10 may include various sensors mounted in the vehicle 1. In the example illustrated in FIG. 1, the sensor unit 10 may include an accelerator-operation-amount sensor 11 and a vehicle-state-amount sensor 12. In some embodiments, the sensor unit 10 may include any other sensor than these sensors.

The accelerator-operation-amount sensor 11 may be configured to detect an accelerator operation amount, based on a depression amount of an accelerator pedal. The accelerator-operation-amount sensor 11 may be configured to output data on the detected accelerator operation amount (i.e., accelerator-operation-amount data) to the control processor 30.

The vehicle-state-amount sensor 12 may be configured to detect a vehicle state amount serving as data indicating a state of the vehicle 1. The vehicle-state-amount sensor 12 may be configured to output time-series data on the detected vehicle state amount (i.e., vehicle-state-amount data) to the control processor 30. In the present example embodiment, the vehicle-state-amount sensor 12 may include sensors configured to detect the vehicle state amount, such as a vehicle speed sensor, an acceleration rate sensor, an angular velocity sensor, a steering angle sensor, a steering torque sensor, or a load sensor.

The vehicle speed sensor may be configured to detect a speed of the vehicle 1 (i.e., a vehicle speed). The vehicle speed sensor may be configured to output time-series data on the detected vehicle speed (i.e., vehicle speed data) to the control processor 30. The acceleration rate sensor may be configured to detect acceleration rates in three directions of the vehicle 1. The acceleration rate sensor may be configured to output time-series data on the detected acceleration rates in the three directions including a longitudinal acceleration rate, a left and right acceleration rate (i.e., a lateral acceleration rate), and a vertical acceleration rate (i.e., acceleration rate data) to the control processor 30. The angular velocity sensor may be configured to detect three angular velocities of the vehicle 1. The angular velocity sensor may be configured to output the detected three angular velocities including a yaw angular velocity (i.e., a yaw rate), a roll angular velocity, and a pitch angular velocity (i.e., angular velocity data) to the control processor 30.

The steering angle sensor may be configured to detect a steering angle of a steering wheel of the vehicle 1 (i.e., a steering wheel angle). The steering angle sensor may be configured to output time-series data on the detected steering wheel angle (i.e., steering-wheel-angle data) to the control processor 30. The steering torque sensor may be configured to detect a steering torque generated by a steering operation performed by a driver who drives the vehicle 1. The steering torque sensor may be configured to output time-series data on the detected steering torque (i.e., steering torque data) to the control processor 30. The load sensor may be configured to detect loads acting on the respective wheels T. The load sensor may be configured to output time-series data on the detected loads (i.e., load data) to the control processor 30.

The storage 20 may hold data such as a control flag 21 received from the control flag inputter 40. The control flag 21 may include an identifier indicating any one of travel modes, i.e., a "torque fluctuation control mode" and a "normal mode". The term "torque fluctuation control mode" may refer to a mode in which torque control is carried out by vibrating the target torque Tg at a low frequency. The term "normal mode" may refer to a mode in which the torque control is performed in accordance with a requested torque Tr without vibrating the target torque Tg at a low frequency.

In some embodiments, the storage 20 may hold a program to be executed by the control processor 30. This program may be adapted to cause the control processor 30 to execute a series of steps that controls an entirety of the vehicle 1. In the present example embodiment, the storage 20 may include a storage device such as a random-access memory (RAM), a read-only memory (ROM), or an auxiliary storage device including a hard disk.

The control processor 30 may be configured to control the entirety of the vehicle 1. In the present example embodiment, the control processor 30 may be a so-called electronic control unit (ECU) including components such as one or more processors or one or more memories. In some embodiments, the control processor 30 may include a central processing unit (CPU). In such embodiments, the control processor 30 may be configured to control the entirety of the vehicle 1 by executing the program held in the storage 20.

The control processor 30 may be configured to control the vehicle 1 that travels by driving the motor 50. In the example illustrated in FIG. 1, the control processor 30 may include a travel processor 31. The travel processor 31 may be configured to control traveling of the vehicle 1 (e.g., a torque of the motor 50). In the example illustrated in FIG. 1, the travel processor 31 may include a requested torque acquirer 32, a fluctuation torque acquirer 33, and the motor torque processor 34.

The requested torque acquirer 32 may be configured to acquire the requested torque Tr corresponding to an acceleration rate request, illustrated in FIG. 4A. The term "acceleration rate request" may refer to depression of the accelerator pedal or a variation in the depression amount of the accelerator pedal. Accordingly, the requested torque acquirer 32 may be configured to acquire the requested torque Tr corresponding to the accelerator operation amount. FIG. 4A is a graph illustrating an exemplary temporal change in the requested torque Tr to be obtained when the driver is depressing the accelerator pedal at a constant speed over time. In some embodiments, the acceleration rate request may be made by the driver in manual driving. In some embodiments, the acceleration rate request may be made by the travel processor 31 in automated driving. The requested torque acquirer 32 may be configured to acquire an amount of the torque to be generated by the motor 50 (i.e., the requested torque Tr), based on the accelerator-operation-amount data received from the accelerator-operation-amount sensor 11.

The fluctuation torque acquirer 33 may be configured to acquire a fluctuation torque Tf that fluctuates cyclically, illustrated in FIG. 4B. The fluctuation torque Tf may be adapted to provide the driver with the driver information by intentionally changing a behavior of the vehicle 1. FIG. 4B is a graph illustrating an exemplary temporal change in the fluctuation torque Tf. The fluctuation torque Tf may be expressed as a value resulting from multiplying a gain of the fluctuation torque Tf (hereinafter referred to as a fluctuation torque gain G) by a basic torque Tf0. In the example illustrated in FIG. 4B, the fluctuation torque gain G may be a value greater than zero. In some embodiments, the fluctuation torque gain G may be zero.

In the present example embodiment, the fluctuation torque Tf may have a value within a fluctuation range from several percentages to several tens of percentages of a magnitude of the requested torque Tr. In the present example embodiment, the fluctuation torque Tf (the basic torque Tf0) may be set to a frequency having a value within the range from 10 Hz to 30 Hz both inclusive. In the present example embodiment, the fluctuation torque Tf (the basic torque Tf0) may have a waveform such as a square waveform or a sine waveform. Note that the fluctuation range, the frequency, and the waveform of the fluctuation torque Tf are not limited to these examples. In some embodiments, the fluctuation torque acquirer 33 may be configured to change one or more of the fluctuation range, the frequency, and the waveform of the basic torque Tf0 in accordance with the magnitude of the requested torque Tr. In some embodiments, the fluctuation torque acquirer 33 may be configured to make one or more of the fluctuation range, the frequency, and the waveform constant regardless of the magnitude of the requested torque Tr.

The fluctuation torque acquirer 33 may be configured to detect whether the vehicle 1 is making a turn, based on the vehicle-state-amount data received from the vehicle-state-amount sensor 12. The fluctuation torque acquirer 33 may be configured to detect whether the vehicle 1 is making a turn, based on a value of one or more of the steering wheel angle, the longitudinal acceleration rate, the lateral acceleration rate, and the yaw rate. The fluctuation torque acquirer 33 is configured to, when detecting that the vehicle 1 is making a turn, set the fluctuation torque gains G to be applied to the respective outer-wheel motors M to higher values than the fluctuation torque gains G to be applied to the respective inner-wheel motors M. In one embodiment, the fluctuation torque gains G to be applied to the respective outer-wheel motors M may each serve as a "first gain". Hereinafter, the fluctuation torque gains G to be applied to the respective outer-wheel motors M may be each referred to as a fluctuation torque gain Gout. In one embodiment, the fluctuation torque gains G to be applied to the respective inner-wheel motors M may each serve as a "second gain". Hereinafter, the fluctuation torque gains G to be applied to the respective inner-wheel motors M may be each referred to as a fluctuation torque gain Gin. The fluctuation torque gain Gout and the fluctuation torque gain Gin are illustrated in Part <A> to Part <D> of FIG. 5 and Part <A> to Part <D> of FIG. 6 to be described later.

Figure 5:
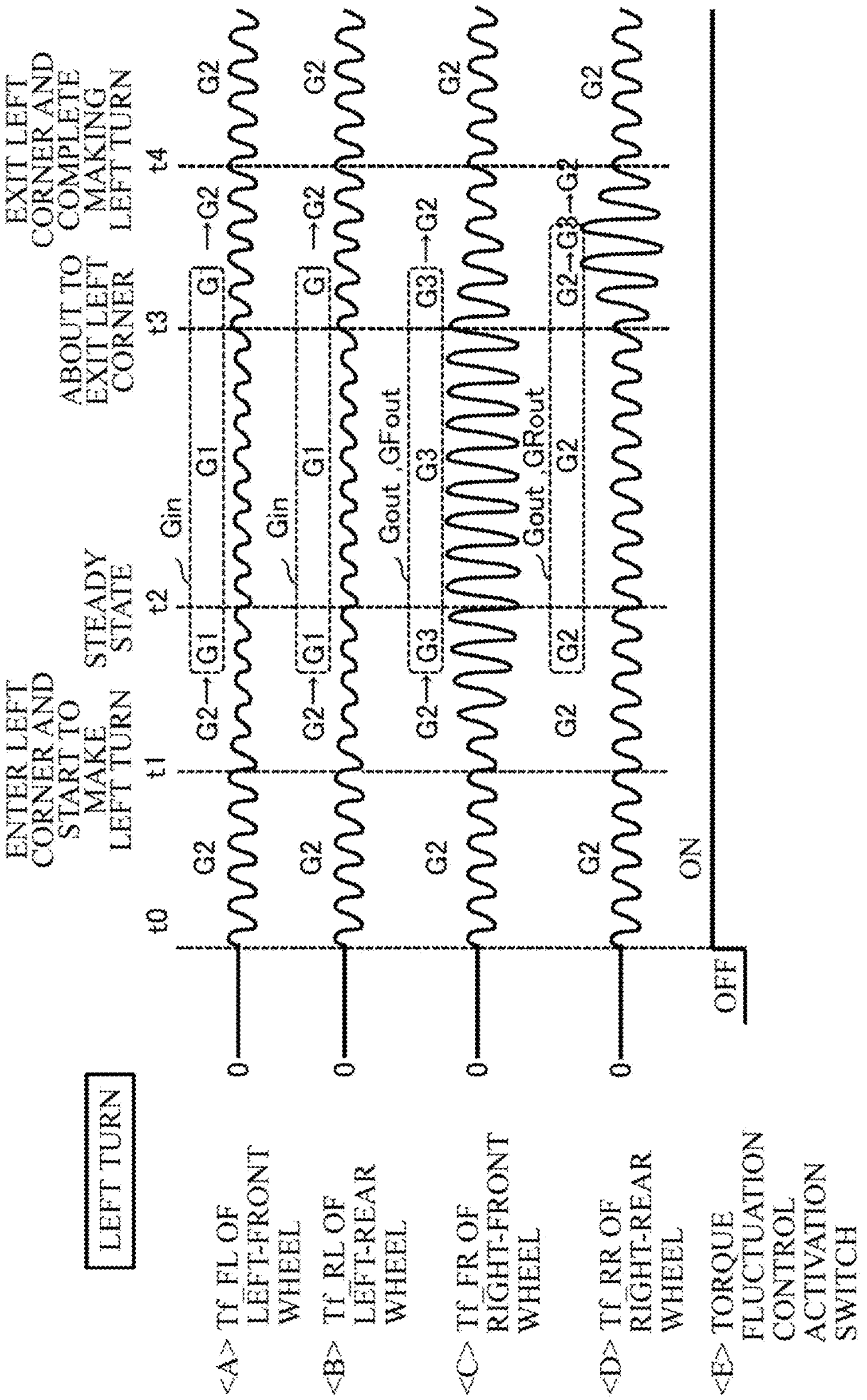
FIG. 5 is a diagram illustrating exemplary waveforms of the fluctuation torques of the respective wheels in a situation where the vehicle illustrated in FIGS. 1 and 2 is making a left turn.

Part <A> to Part <D> of FIG. 5 illustrate exemplary waveforms of the fluctuation torques Tf of the respective wheels T in a situation where the vehicle 1 is making a left turn. Part <E> of FIG. 5 illustrates an exemplary waveform indicating an on state and an off state of an activation switch for torque fluctuation control. In Part <A> to Part <E> of FIG. 5, time t1 may indicate a time when the vehicle 1 enters a left corner and starts to make the left turn. Time t2 may indicate a time when the vehicle 1 becomes constant in angular velocity and is brought into a steady state after entering the left corner. Time t3 may indicate a time when the vehicle 1 is about to exit the left corner and starts to change in the angular velocity again. Time t4 may indicate a time when the vehicle 1 exits the left corner and completes making the left turn. In Part <A> to Part <D> of FIG. 5, fluctuation torque gains G1, G2, and G3 may represent respective exemplary fluctuation torque gains G to be applied to the motors M. The fluctuation torque gain G2 may have a higher value than the fluctuation torque gain G1. The fluctuation torque gain G3 may have a higher value than the fluctuation torque gain G2.

The fluctuation torque acquirer 33 may be configured to, when detecting that the vehicle 1 is making the left turn, set the fluctuation torque gain Gout serving as each of the fluctuation torque gain G of the fluctuation torque Tf to be applied to the right-front-wheel motor M_FR (hereinafter referred to as a right-front-wheel fluctuation torque Tf_FR) and the fluctuation torque gain G of the fluctuation torque Tf to be applied to the right-rear-wheel motor M_RR (hereinafter referred to as a right-rear-wheel fluctuation torque Tf_RR) to a higher value than the fluctuation torque gain Gin serving as each of the fluctuation torque gain G of the fluctuation torque Tf to be applied to the left-front-wheel motor M_FL (hereinafter referred to as a left-front-wheel fluctuation torque Tf_FL) and the fluctuation torque gain G of the fluctuation torque Tf to be applied to the left-rear-wheel motor M_RL (hereinafter referred to as a left-rear-wheel fluctuation torque Tf_RL). In the present example embodiment, as illustrated in Part <A> to Part <D> of FIG. 5, the fluctuation torque acquirer 33 may be configured to set the fluctuation torque gain Gout to a higher value than the fluctuation torque gain Gin when the vehicle 1 is traveling in the left corner (in a time period from the time t1 to the time t4).

Figure 6:
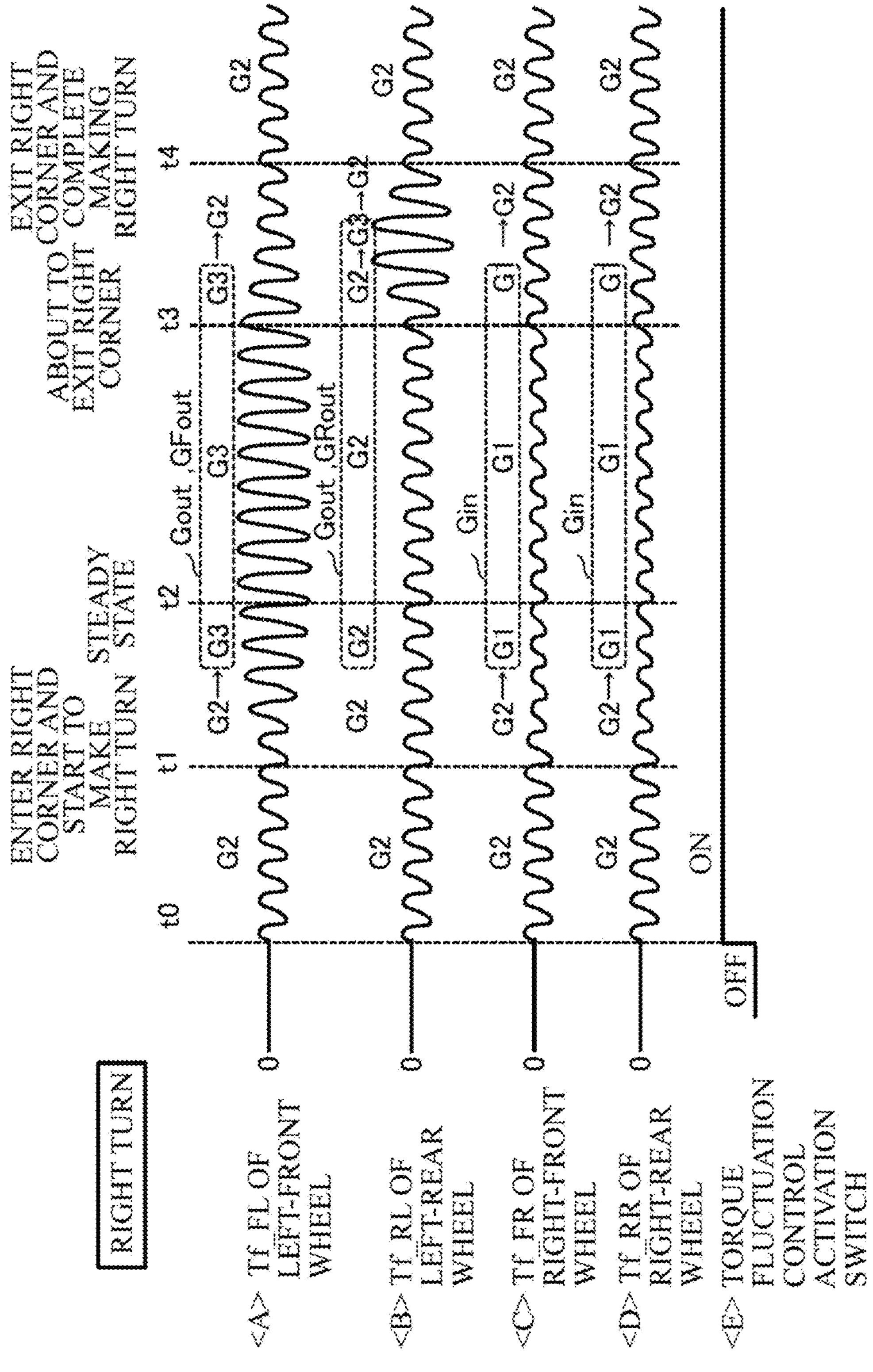
FIG. 6 is a diagram illustrating exemplary waveforms of the fluctuation torques of the respective wheels in a situation where the vehicle illustrated in FIGS. 1 and 2 is making a right turn.

Part <A> to Part <D> of FIG. 6 illustrate exemplary waveforms of the fluctuation torques Tf of the respective wheels T in a situation where the vehicle 1 is making a right turn. Part <E> of FIG. 6 illustrates an exemplary waveform indicating the on state and the off state of the activation switch for the torque fluctuation control. In Part <A> to Part <E> of FIG. 6, the time t1 may indicate a time when the vehicle 1 enters a right corner and starts to make the right turn. The time t2 may indicate a time when the vehicle 1 becomes constant in the angular velocity and is brought into the steady state after entering the right corner. The time t3 may indicate a time when the vehicle 1 is about to exit the right corner and starts to change in the angular velocity again. The time t4 may indicate a time when the vehicle 1 exits the right corner and completes making the right turn.

The fluctuation torque acquirer 33 may be configured to, when detecting that the vehicle 1 is making the right turn, set the fluctuation torque gain Gout serving as each of the fluctuation torque gain G to be applied to the left-front-wheel motor M_FL and the fluctuation torque gain G to be applied to the left-rear-wheel motor M_RL to a higher value than the fluctuation torque gain Gin serving as each of the fluctuation torque gain G to be applied to the right-front-wheel motor M_FR and the fluctuation torque gain G to be applied to the right-rear-wheel motor M_RR. In the present example embodiment, as illustrated in Part <A> to Part <D> of FIG. 6, the fluctuation torque acquirer 33 may be configured to set the fluctuation torque gain Gout to a higher value than the fluctuation torque gain Gin when the vehicle 1 is traveling in the right corner (in the time period from the time t1 to the time t4).

The fluctuation torque acquirer 33 may be configured to, when the vehicle 1 has entered a corner and started to make a turn, set the fluctuation torque gain G to be applied to the front-outer-wheel motor M (hereinafter referred to as a fluctuation torque gain GFout) to a higher value than the fluctuation torque gain G to be applied to the rear-outer-wheel motor M (hereinafter referred to as a fluctuation torque gain GRout). The fluctuation torque acquirer 33 may be configured to, when the vehicle 1 is about to exit the corner and complete making the turn, set the fluctuation torque gain GRout to a higher value than the fluctuation torque gain GFout. In one embodiment, the fluctuation torque gain GFout may serve as a “third gain”. In one embodiment, the fluctuation torque gain GRout may serve as a “fourth gain”.

In the present example embodiment, as illustrated in Part <C> and Part <D> of FIG. 5, the fluctuation torque acquirer 33 may be configured to, when the vehicle 1 has entered the left corner and started to make the left turn (in a time period from the time t1 to the time t2), set the fluctuation torque gain GFout to be applied to the right-front-wheel motor M_FR to a higher value than the fluctuation torque gain GRout to be applied to the right-rear-wheel motor M_RR. In the present example embodiment, as illustrated in Part <C> and Part <D> of FIG. 5, the fluctuation torque acquirer 33 may be configured to, when the vehicle 1 is about to exit the left corner and complete making the left turn (in a time period from the time t3 to the time t4), set the fluctuation torque gain GRout to a higher value than the fluctuation torque gain GFout.

In the present example embodiment, as illustrated in Part <A> and Part <B> of FIG. 6, the fluctuation torque acquirer 33 may be configured to, when the vehicle 1 has entered the right corner and started to make the right turn (in the time period from the time t1 to the time t2), set the fluctuation torque gain GFout to be applied to the left-rear-wheel motor M_FL to a higher value than the fluctuation torque gain GRout to be applied to the left-rear-wheel motor M_RL. In the present example embodiment, as illustrated in Part <A> and Part <B> of FIG. 6, the fluctuation torque acquirer 33 may be configured to, when the vehicle 1 is about to exit the right corner and complete making the right turn (in the time period from the time t3 to the time t4), set the fluctuation torque gain GRout to a higher value than the fluctuation torque gain GFout.

The fluctuation torque acquirer 33 may be configured to change the value of the fluctuation torque gain GFout and the value of the fluctuation torque gain GRout smoothly in accordance with a change in loads acting on the respective outer wheels T. In the present example embodiment, the fluctuation torque acquirer 33 may be configured to calculate the change in the loads, based on the load data received from the load sensor. In some embodiment, the fluctuation torque acquirer 33 may be configured to calculate the change in the loads, based on data received from the various sensors other than the load sensor.

In the present example embodiment, as illustrated in Part <C> of FIG. 5, the fluctuation torque acquirer 33 may be configured to, when the vehicle 1 has entered the left corner and started to make the left turn (in the time period from the time t1 to the time t2), change (increase) the value of the fluctuation torque gain G of the right-front-wheel fluctuation torque Tf_FR (the fluctuation torque gain GFout) smoothly in accordance with a change in load acting on the right-front wheel T_FR. In the present example embodiment, as illustrated in Part <C> of FIG. 5, the fluctuation torque acquirer 33 may be configured to, when the vehicle 1 is about to exit the left corner and complete making the left turn (in the time period from the time t3 to the time t4), change (decrease) the value of the fluctuation torque gain G of the right-front-wheel fluctuation torque Tf_FR (the fluctuation torque gain GFout) smoothly in accordance with the change in the load acting on the right-front wheel T_FR. In the present example embodiment, as illustrated in Part <D> of FIG. 5, the fluctuation torque acquirer 33 may be configured to, when the vehicle 1 is about to exit the left corner and complete making the left turn (in the time period from the time t3 to the time t4), change (temporarily increase) the value of the fluctuation torque gain G of the right-rear-wheel fluctuation torque Tf_RR (the fluctuation torque gain GRout) smoothly in accordance with a change in load acting on the right-rear wheel T_RR.

In the present example embodiment, as illustrated in Part <A> of FIG. 6, the fluctuation torque acquirer 33 may be configured to, when the vehicle 1 has entered the right corner and started to make the right turn (in the time period from the time t1 to the time t2), change (increase) the value of the fluctuation torque gain G of the left-front-wheel fluctuation torque Tf_FL (the fluctuation torque gain GFout) smoothly in accordance with a change in load acting on the left-front wheel T_FL. In the present example embodiment, as illustrated in Part <A> of FIG. 6, the fluctuation torque acquirer 33 may be configured to, when the vehicle 1 is about to exit the right corner and complete making the right turn (in the time period from the time t3 to the time t4), change (decrease) the value of the fluctuation torque gain G of the left-front-wheel fluctuation torque Tf_FL (the fluctuation torque gain GFout) smoothly in accordance with the change in the load acting on the left-front wheel T_FL. In the present example embodiment, as illustrated in Part <B> of FIG. 6, the fluctuation torque acquirer 33 may be configured to, when the vehicle 1 is about to exit the right corner and complete making the right turn (in the time period from the time t3 to the time t4), change (temporarily increase) the value of the fluctuation torque gain G of the left-rear-wheel fluctuation torque Tf_RL (the fluctuation torque gain GRout) smoothly in accordance with a change in load acting on the left-rear wheel T_RL.

The fluctuation torque acquirer 33 may be configured to, when detecting the vehicle 1 is traveling straight, set each of the fluctuation torque gains G to be applied to the respective motors M to a value greater than or equal to the fluctuation torque gain Gin and less than or equal to the fluctuation torque gain Gout. In some embodiments, the fluctuation torque acquirer 33 may be configured to, when detecting the vehicle 1 is traveling straight, set each of the fluctuation torque gains G to be applied to the respective motors M to a value greater than the fluctuation torque gain Gin to be applied to the front-inner-wheel motor M when the vehicle 1 is making a turn in the steady state (in the time period from the time t2 to the time t3) and less than the fluctuation torque gain Gout to be applied to the front-outer-wheel motor M when the vehicle 1 is making the turn in the steady state (in the time period from the time t2 to the time t3).

The motor torque processor 34 may be configured to independently control the torques of the respective four motors M (i.e., the left-front-wheel motor M_FL, the right-front-wheel motor M_FR, the left-rear-wheel motor M_RL, and the right-rear-wheel motor M_RR). The motor torque processor 34 may be configured to, when the travel mode is the normal mode, set the requested torques Tr of the respective wheels T as the target torques Tg of the respective wheels T. The motor torque processor 34 may be further configured to control the torques of the respective four motors M (i.e., the left-front-wheel motor M_FL, the right-front-wheel motor M_FR, the left-rear-wheel motor M_RL, and the right-rear-wheel motor M_RR), based on the set target torques Tg of the respective wheels T.

The motor torque processor 34 may be configured to, when the travel mode is the torque fluctuation control mode, acquire the target torques Tg, such as one illustrated in FIG. 4C, for the respective wheels T, by adding the fluctuation torques Tf of the respective wheels T to the requested torques Tr of the respective wheels T. The motor torque processor 34 may be further configured to control the torques of the respective four motors M (i.e., the left-front-wheel motor M_FL, the right-front-wheel motor M_FR, the left-rear-wheel motor M_RL, and the right-rear-wheel motor M_RR), based on the acquired target torques Tg of the respective wheels T.

The motor torque processor 34 may be configured to determine whether it is necessary to add the fluctuation torque Tf to the requested torque Tr, based on the control flag 21. The motor torque processor 34 may be configured to, when the control flag 21 indicates the torque fluctuation control mode, acquire the target torque Tg by adding the fluctuation torque Tf to the requested torque Tr. The motor torque processor 34 may be configured to, when the control flag 21 indicates the normal mode, set the requested torque Tr as the target torque Tg without adding the fluctuation torque Tf to the requested torque Tr.

The control flag inputter 40 may be configured to receive an input of the control flag 21 from the driver. In some embodiments, the control flag inputter 40 may be a paddle shift attached to the steering wheel. The control flag inputter 40 may be configured to, when the driver simultaneously holds down left and right paddle shifts, store the control flag 21 of "1" in the storage 20. The control flag inputter 40 may be configured to, when the driver simultaneously holds down the left and right paddle shifts again after the control flag 21 of "1" has been stored in the storage 20 in the previous operation, store the control flag 21 of "0" in the storage 20. The control flag inputter 40 may be configured to, when the driver simultaneously holds down the left and right paddle shifts again after the control flag 21 of "0" has been stored in the storage 20 in the previous operation, store the control flag 21 of "1" in the storage 20.

In one example, the control flag 21 of "1" may indicate the torque fluctuation control mode. In another example, the control flag 21 of "0" may indicate the normal mode in which cyclic torque fluctuation control is not performed. Note that a possible value of the control flag 21 is not limited to the values described above.

<Operation>

Figure 7:
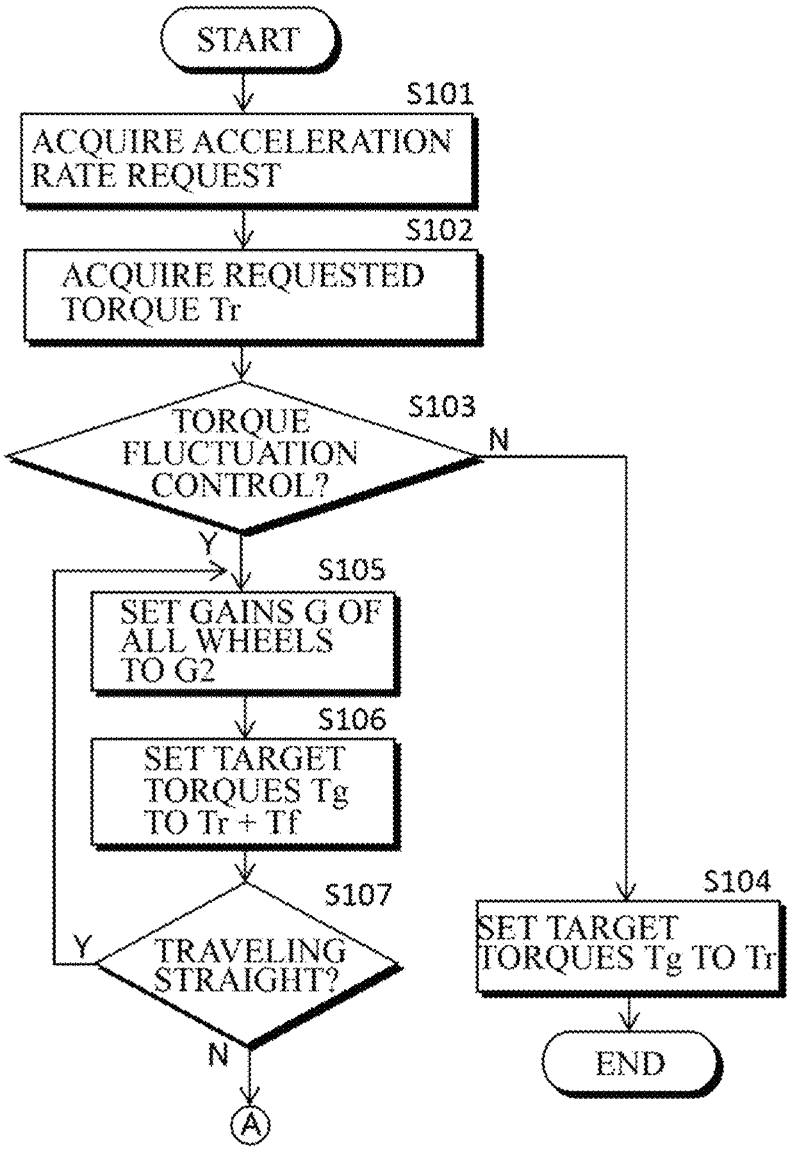
FIG. 7 is a flowchart illustrating an exemplary procedure of acquiring the target torques to be performed by the vehicle illustrated in FIGS. 1 and 2.
Figure 8:
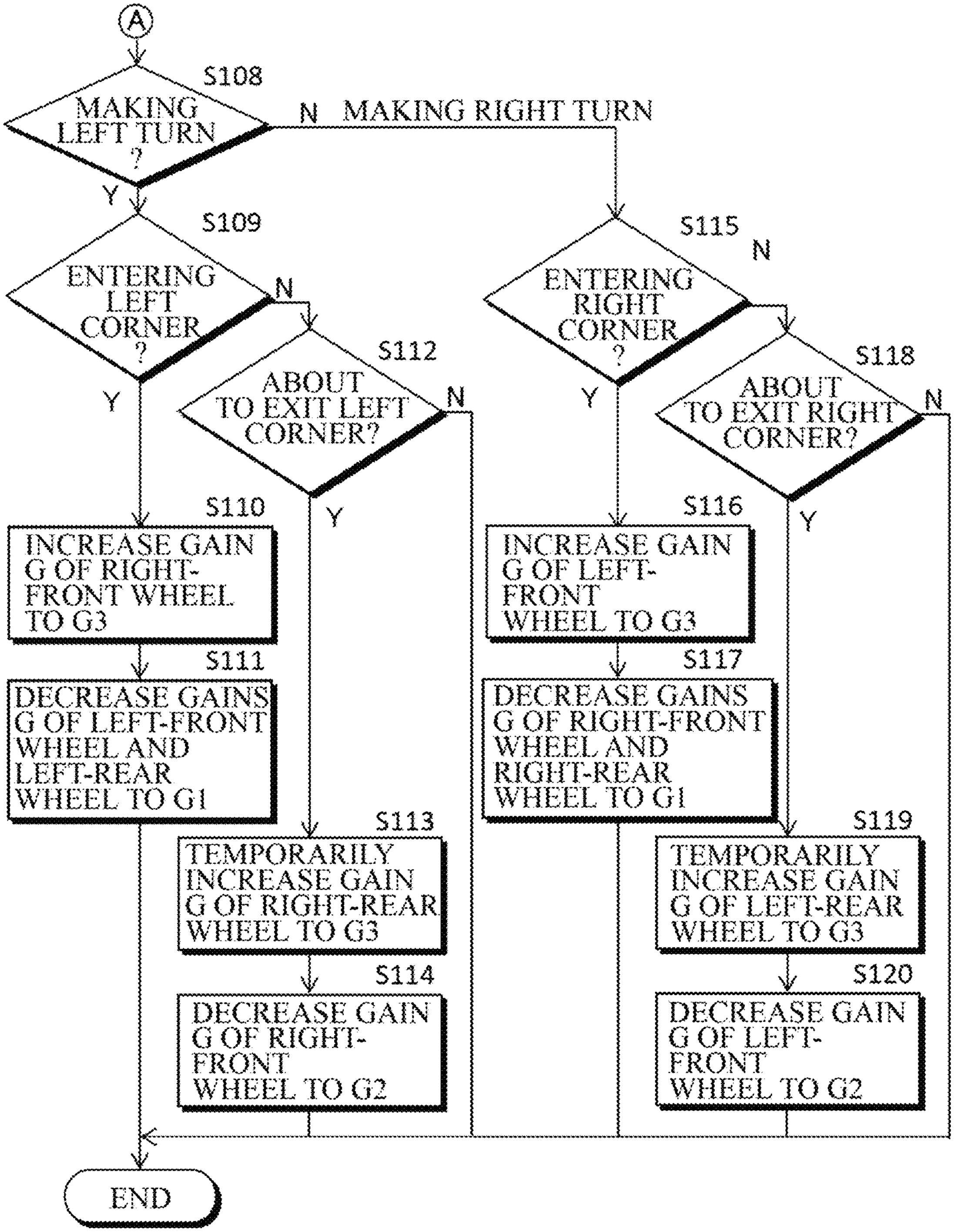
FIG. 8 is a flowchart illustrating an exemplary procedure subsequent to the procedure illustrated in FIG. 7.

Next, an exemplary operation of the travel processor 31 will be described with reference to FIGS. 7 and 8. FIGS. 7 and 8 are each a flowchart illustrating an exemplary procedure of acquiring the target torque Tg.

The travel processor 31 may acquire the acceleration rate request from the accelerator-operation-amount sensor 11 (step S101). Thereafter, the travel processor 31 may acquire the requested torques Tr corresponding to the acquired acceleration rate request (step S102). Thereafter, if the control flag 21 received from the control flag inputter 40 indicates the normal mode (step S103: N), the travel processor 31 may set the target torques Tg of all the wheels T to the respective requested torques Tr (step S104).

If the control flag 21 received from the control flag inputter 40 indicates the torque fluctuation control mode (step S103: Y), the travel processor 31 may set the fluctuation torque gains G of all the wheels T to the fluctuation torque gain G2 (step S105). The travel processor 31 may further set the target torques Tg of all the wheels T to respective torques resulting from adding the requested torques Tr and the fluctuation torques Tf (Tr+Tf=Tr+G×Tf0), based on the set fluctuation torque gains G (step S106).

The travel processor 31 may determine whether the vehicle 1 is traveling straight, based on the value of one or more of the steering wheel angle, the longitudinal acceleration rate, the lateral acceleration rate, and the yaw rate (step S107). If determining that the vehicle 1 is traveling straight (step S107: Y), the travel processor 31 may execute step S105. If determining that the vehicle 1 is not traveling straight (step S107: N), the travel processor 31 may determine whether the vehicle 1 is making a left turn (step S108).

If determining that the vehicle 1 is making the left turn (step S108: Y), the travel processor 31 may determine whether the vehicle 1 is at the time of entering the left corner and starting to make the left turn (step S109). If determining that the vehicle 1 is at the time of entering the left corner and starting to make the left turn (step S109: Y), the travel processor 31 may increase the fluctuation torque gain G of the right-front wheel T_FR to the fluctuation torque gain G3 (step S110). The travel processor 31 may further decrease the respective fluctuation torque gains G of the left-front wheel T_FL and the left-rear wheel T_RL to the fluctuation torque gain G1 (step S111). If determining that the vehicle 1 is not at the time of entering the left corner and starting to make the left turn (step S109: N), the travel processor 31 may determine whether the vehicle 1 is at the time of being about to exit the left corner (step S112).

If determining that the vehicle 1 is at the time of being about to exit the left corner (step S112: Y), the travel processor 31 may temporarily increase the fluctuation torque gain G of the right-rear wheel T_RR to the fluctuation torque gain G3 (step S113). The travel processor 31 may further decrease the fluctuation torque gain G of the right-front wheel T_FR to the fluctuation torque gain G2 (step S114). If determining that the vehicle 1 is not at the time of being about to exit the left corner and is at the time of becoming constant in the angular velocity (step S112: N), the travel processor 31 may maintain the fluctuation torque gains G of the respective wheels T.

If determining that the vehicle 1 is not making a left turn and is making a right turn (step S108: N), the travel processor 31 may determine whether the vehicle 1 is at the time of entering the right corner and starting to make the right turn (step S115). If determining that the vehicle 1 is at the time of entering the right corner and starting to make the right turn (step S115: Y), the travel processor 31 may increase the fluctuation torque gain G of the left-front wheel T_FL to the fluctuation torque gain G3 (step S116). The travel processor 31 may further decrease the respective fluctuation torque gains G of the right-front wheel T_FR and the right-rear wheel T_RR to the fluctuation torque gain G1 (step S117). If determining that the vehicle 1 is not at the time of entering the right corner and starting to make the right turn (step S115: N), the travel processor 31 may determine whether the vehicle 1 is at the time of being about to exit the right corner (step S118).

If determining that the vehicle 1 is at the time of being about to exit the right corner (step S118: Y), the travel processor 31 may increase the fluctuation torque gain G of the left-rear wheel T_RL to the fluctuation torque gain G3 (step S119). The travel processor 31 may further decrease the fluctuation torque gain G of the left-front wheel T_FL to the fluctuation torque gain G2 (step S120). If determining that the vehicle 1 is not at the time of being about to exit the right corner and is at the time of becoming constant in the angular velocity (step S118: N), the travel processor 31 may maintain the fluctuation torque gains G of the respective wheels T.

In this way, the travel processor 31 may set the fluctuation torque gains G of the respective four motors M (i.e., the left-front-wheel motor M_FL, the right-front-wheel motor M_FR, the left-rear-wheel motor M_RL, and the right-rear-wheel motor M_RR). In the example where the vehicle 1 is making the left turn, the travel processor 31 may set the target torques Tg of the respective wheels T, based on the fluctuation torque gains G, set as illustrated in Part <A> to Part <D> of FIG. 5, of the respective wheels T, and perform the torque control of the respective motors M, based on the set target torques Tg of the respective wheels T. In the example where the vehicle 1 is making the right turn, the travel processor 31 may set the target torques Tg of the respective wheels T, based on the fluctuation torque gains G, set as illustrated in Part <A> to Part <D> of FIG. 6, of the respective wheels T, and perform the torque control of the respective motors M, based on the set target torques Tg of the respective wheels T.

Next, some example effects of the control processor 30 and the vehicle 1 according to the present example embodiment of the disclosure will be described.

In the present example embodiment, the target torques Tg of the respective wheels T are acquired by adding the fluctuation torques Tf of the respective wheels T that each fluctuate cyclically to the requested torques Tr of the respective wheels T that correspond to the accelerator operation amount, and the torque control of the motors M is performed based on the acquired target torques Tg of the respective wheels T. At this time, when the vehicle 1 has been detected to be making the turn, the fluctuation torque gains Gout to be applied to the respective outer-wheel motors M are set to the higher values than the fluctuation torque gains Gin to be applied to the respective inner-wheel motors M. Such a configuration, when the vehicle 1 is traveling through a curve, applies the target torques Tg having larger vibration amplitudes to the respective motors M of the outer wheels T on which higher loads are acting than on the inner wheels T, and applies the target torques Tg having smaller vibration amplitudes to the respective motors M of the inner wheels T on which lower loads are acting than on the outer wheels T. This helps to notify, at an early stage, the driver of a decrease in grip of the outer wheels T on the low-μ road such as the wet road, the snowy road, or the icy road, avoiding an occurrence of slipping of the vehicle 1 to prevent spinning and understeer of the vehicle 1. Therefore, the configuration helps to perform the torque control that copes with the curve traveling.

In some embodiments, when the vehicle 1 has entered the corner and started to make the turn, the fluctuation torque gain GFout to be applied to the front-outer-wheel motor M may be set to the higher value than the fluctuation torque gain GRout to be applied to the rear-outer-wheel motor M. Such a configuration, when the vehicle 1 has entered the corner, applies the target torque Tg having a larger vibration amplitude to the motor M of the front-outer wheel T on which a higher load is acting than on the rear-outer wheel T, and applies the target torque Tg having a smaller vibration amplitude to the motor M of the rear-outer wheel T on which a lower load is acting than on the front-outer wheel T. In such embodiments, when the vehicle 1 is about to exit the corner and complete making the turn, the fluctuation torque gain GRout to be applied to the rear-outer-wheel motor M may be set to the higher value than the fluctuation torque gain GFout to be applied to the front-outer-wheel motor M. Such a configuration, when the vehicle 1 is about to exit the corner, applies the target torque Tg having a larger vibration amplitude to the motor M of the rear-outer wheel T on which a higher load is acting than on the front-outer wheel T, and applies the target torque Tg having a smaller vibration amplitude to the motor M of the front-outer wheel T on which a lower load is acting than on the rear-outer wheel T.

The configurations help to notify, at the early stage, the driver of: a decrease in grip of the front-outer wheel T caused when the vehicle 1 has entered the corner on the low-μ road such as the wet road, the snowy road, or the icy road; and a decrease in grip of the rear-outer wheel T caused when the vehicle 1 is about to exit the corner on these low-μ roads. This helps to avoid the occurrence of the slipping of the vehicle 1 to prevent the spinning and understeer of the vehicle 1. Therefore, the configurations help to perform the torque control that copes with the curve traveling.

In some embodiments, the values of the fluctuation torque gains Gout to be applied to the respective outer-wheel motors M may be changed smoothly in accordance with the change in the loads acting on the outer wheels T. Such a configuration helps to notify, at the early stage, the driver of a decrease in the grip of the front-outer wheel T caused when the vehicle 1 has entered the corner and a decrease in the grip of the rear-outer wheel T caused when the vehicle 1 is about to exit the corner, while changing a behavior of the vehicle 1 smoothly. This helps to avoid the occurrence of the slipping of the vehicle 1 to prevent the spinning and understeer of the vehicle 1. Therefore, the configuration helps to perform the torque control that copes with the curve traveling.

In some embodiments, when the vehicle 1 has been detected to be traveling straight, the fluctuation torque gains G of the respective motors M may be set to the values greater than the fluctuation torque gains Gin to be applied to the respective inner-wheel motors M when the vehicle 1 is traveling through the curve and less than the fluctuation torque gains Gout to be applied to the respective outer-wheel motors M when the vehicle 1 is traveling through the curve. Such a configuration helps to notify, at the early stage, the driver of a decrease in the grip of the respective wheels T caused when the vehicle 1 is traveling straight on the low-μ road such as the wet road, the snowy road, or the icy road. This helps to avoid the occurrence of slipping of the vehicle 1 to prevent spinning of the vehicle 1. Therefore, the configuration helps to perform the torque control that copes with the straight traveling.

In some embodiments, the detection as to whether the vehicle 1 is making the turn may be performed based on the value of one or more of the steering wheel angle, the longitudinal acceleration rate, the lateral acceleration rate, and the yaw rate. Such a configuration helps to perform the torque control that copes with the curve traveling and straight traveling.

Although the disclosure has been described above with reference to the example embodiment, the disclosure is not limited to the example embodiment, and various modifications may be made.

Figure 9:
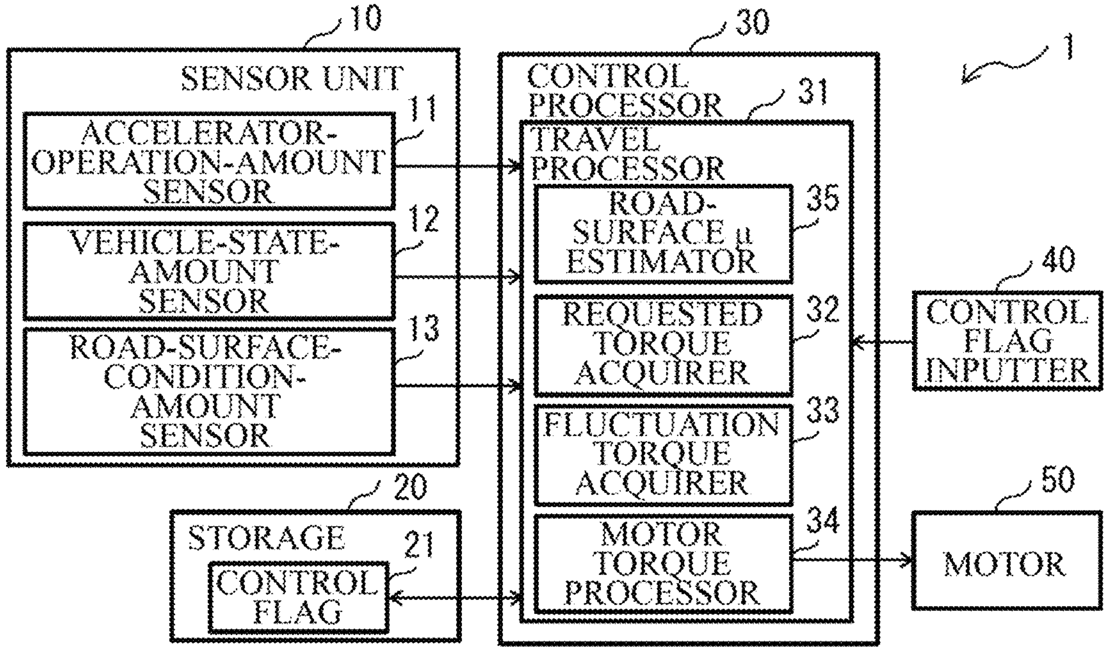
FIG. 9 is a block diagram illustrating a modification example of the configuration of the vehicle illustrated in FIGS. 1 and 2.

FIG. 9 is a block diagram illustrating a modification example of the configuration of the vehicle 1 illustrated in FIGS. 1 and 2. In the present modification example, the sensor unit 10 may additionally include a road-surface-condition-amount sensor 13, and the travel processor 31 may additionally include a road-surface friction-coefficient (μ) estimator 35, as illustrated in FIG. 9, for example.

The road-surface-condition-amount sensor 13 may be configured to detect a road-surface-condition amount serving as data indicating a condition of a road surface of a lane in which the vehicle 1 is traveling. The road-surface-condition-amount sensor 13 may be configured to output time-series data on the detected road-surface-condition amount (i.e., road-surface-condition-amount data) to the control processor 30. The road-surface-condition-amount sensor 13 may include sensors configured to detect the road-surface-condition amount, such as a camera, a temperature sensor (e.g., an ambient temperature sensor and a road-surface-temperature sensor), a near-infrared sensor, or a laser sensor (e.g., a time-of-flight (ToF) sensor).

The camera may be configured to capture an image of an area in front of the vehicle 1. The camera may be configured to output time-series data on the captured image (i.e., image data) to the control processor 30. The ambient temperature sensor may be configured to detect ambient temperature of the vehicle 1. The ambient temperature sensor may be configured to output time-series data on the detected ambient temperature (i.e., ambient temperature data) to the control processor 30. The road-surface-temperature sensor may be configured to detect temperature of the road surface of the lane in which the vehicle 1 is traveling. The road-surface-temperature sensor may be configured to output time-series data on the detected temperature (i.e., road-surface-temperature data) to the control processor 30.

The near-infrared sensor may be configured to radiate near-infrared light to the road surface of the lane in which the vehicle 1 is traveling, and detect the reflected light in a near-infrared region from the road surface. The near-infrared sensor may be configured to output time-series data on the detected reflected light in the near-infrared region (i.e., near-infrared data) to the control processor 30. The laser sensor may be configured to radiate laser light to the road surface of the lane in which the vehicle 1 is traveling, and detect the reflected laser light from the road surface. The laser sensor may be configured to output time-series data on the detected reflected laser light (i.e., laser light data) to the control processor 30.

The road-surface μ estimator 35 may be configured to estimate a friction coefficient of the road surface (i.e., a road-surface μ value), based on the road-surface-condition-amount data received from the road-surface-condition-amount sensor 13. In the present modification example, the road-surface μ estimator 35 may be configured to estimate characteristics such as a color or roughness of the road surface in front of the vehicle 1, based on the image data provided by the camera. The road-surface μ estimator 35 may be configured to estimate a moisture amount of the road surface on which the vehicle 1 is to travel, based on data including the ambient temperature data, the road-surface-temperature data, and the near-infrared data. The road-surface μ estimator 35 may be configured to estimate the condition (e.g., dry and wet) and a type (e.g., asphalt, snowy, and icy) of the road surface on which the vehicle 1 is to travel, based on data including the laser light data. The road-surface μ estimator 35 may be configured to estimate the friction coefficient (the road-surface μ value) of the road surface on which the vehicle 1 is to travel, based on data including the estimated data (e.g., one or more of the color, the roughness, the moisture amount, the condition, and the type of the road surface). Note that the road-surface μ estimator 35 may be configured to estimate the road-surface μ value by any other method than the above-described methods.

In the present modification example, the road-surface μ estimator 35 may be further configured to calculate slip ratios s of the respective wheels T, based on the following expression:

$$s = (V - Vw)/Vw$$

where V is the speed of the vehicle 1, and Vw is a speed of each wheel T.

The road-surface μ estimator 35 may be configured to output the estimated road-surface μ value and the calculated slip ratios s to the motor torque processor 34.

Figure 10:
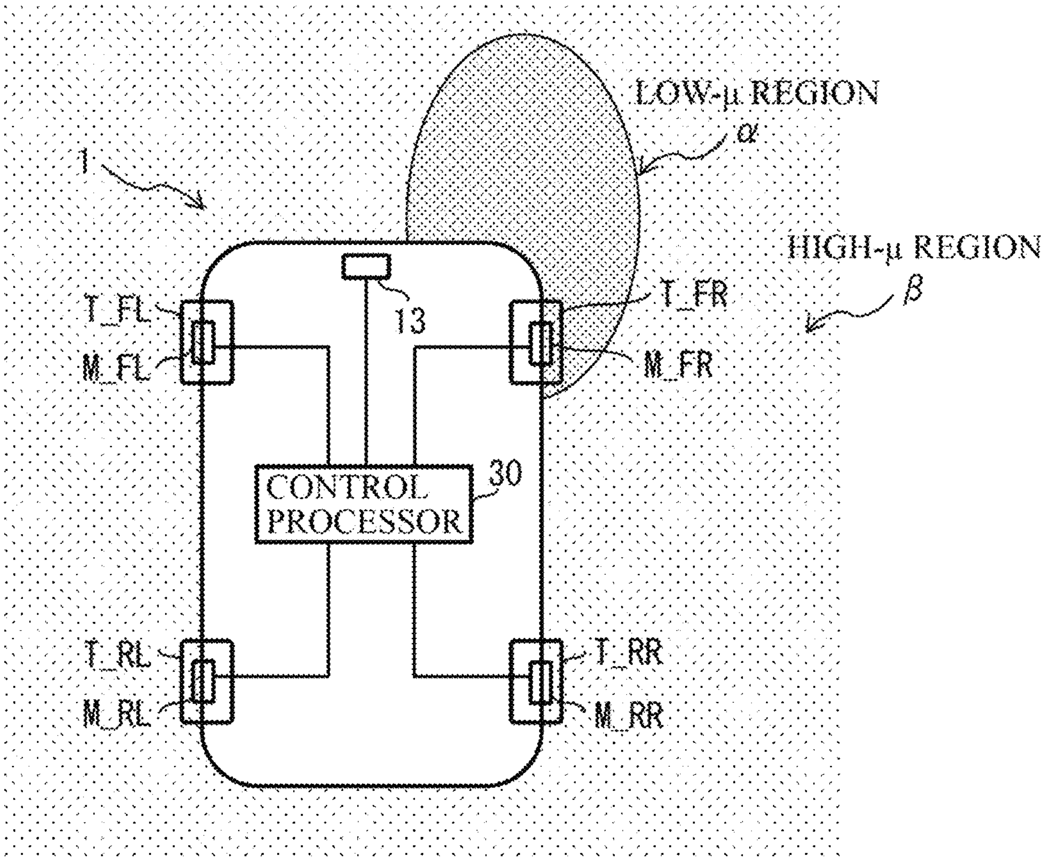
FIG. 10 is a diagram illustrating an exemplary road surface on which the vehicle illustrated in FIG. 9 is to travel.

In the example illustrated in FIG. 10, the motor torque processor 34 may be configured to detect a low-μ region α on the road surface in front of the vehicle 1 and a high-μ region β on the road surface in front of the vehicle 1, based on the road-surface μ value estimated by the road-surface μ estimator 35. The low-μ region α may have a lower road-surface μ value than a surrounding road surface. The motor torque processor 34 may be configured to, when detecting the low-μ region α, set the fluctuation torque gain G to be applied to one or more of the motors M provided to corresponding one or more of the wheels T that are to pass through the low-μ region α to a higher value than the fluctuation torque gain G to be applied to remaining one or more of the motors M provided to corresponding one or more of the wheels T that are not to pass through the low-μ region α.

Figure 11:
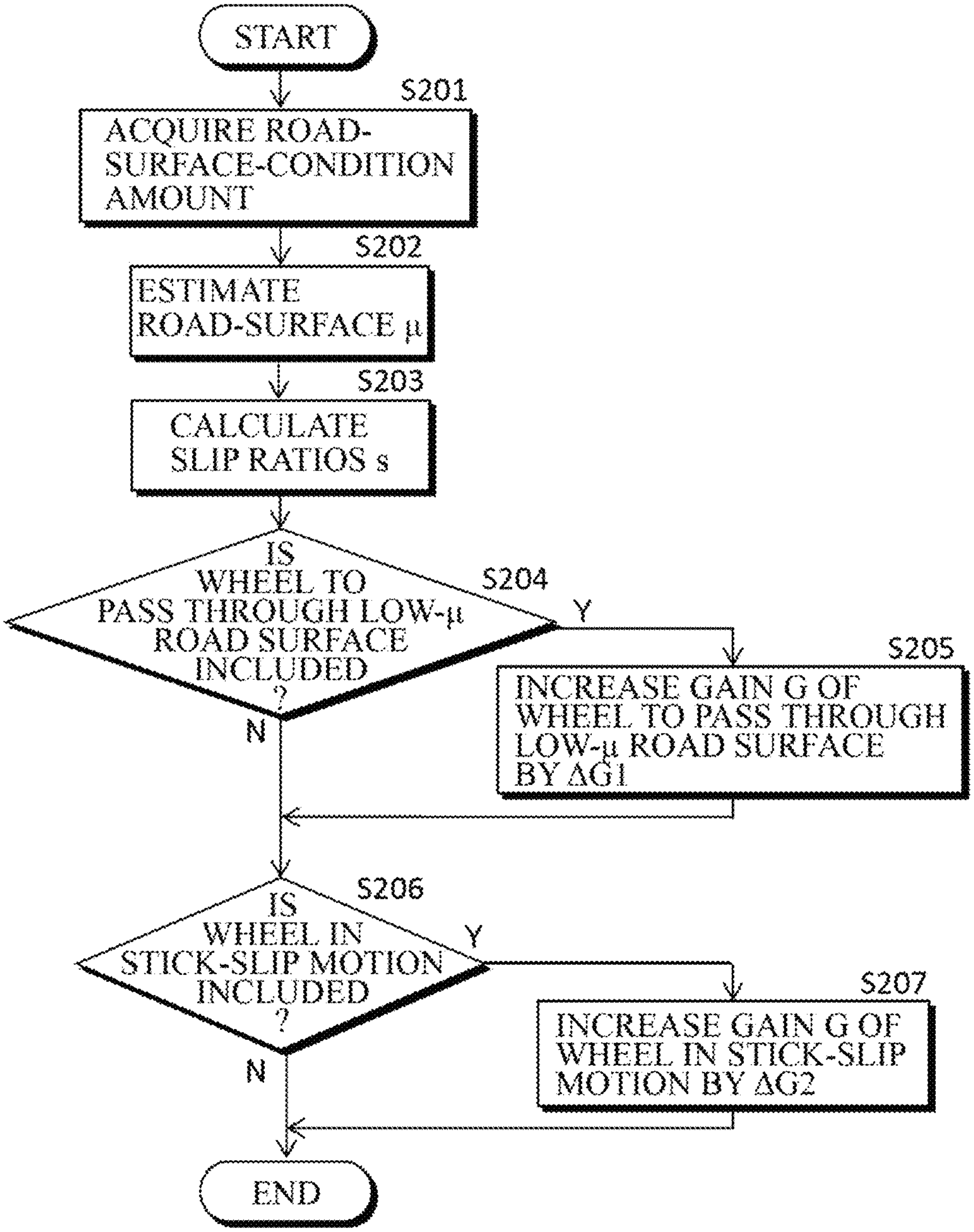
FIG. 11 is a flowchart illustrating an exemplary procedure of acquiring a fluctuation torque gain to be performed by the vehicle illustrated in FIGS. 9 and 10.

Next, the exemplary operation of the travel processor 31 will be described with reference to FIG. 11. FIG. 11 is a flowchart illustrating an exemplary procedure of acquiring the fluctuation torque gain G.

The travel processor 31 may acquire the road-surface-condition-amount data from the road-surface-condition-amount sensor 13 (step S201). The travel processor 31 may estimate the road-surface μ value, based on the acquired road-surface-condition-amount data (step S202). The travel processor 31 may further calculate the slip ratios s of the respective wheels T, based on the expression of $s=(V-Vw)/Vw$ (step S203).

The travel processor 31 may detect the low-μ region α on the road surface in front of the vehicle 1 and the high-μ region β on the road surface in front of the vehicle 1, based on the road-surface μ value. When detecting the low-μ region α, the travel processor 31 may determine whether the wheels T include one or more wheels T that are to pass through the low-μ region α (step S204). If the wheels T include one or more wheels T that are to pass through the low-μ region α (step S204: Y), the travel processor 31 may increase, by ΔG1, the fluctuation torque gain G to be applied to one or more motors M corresponding to the one or more wheels T that are to pass through the low-μ region α (step S205).

The travel processor 31 may determine whether the wheels T include one or more wheels T in a stick-slip motion, based on the slip ratios s of the respective wheels T (step S206). If the wheels T include one or more wheels T in the stick-slip motion (step S206: Y), the travel processor 31 may increase, by ΔG2, the fluctuation torque gain G to be applied to one or more motors M corresponding to the one or more wheels T in the stick-slip motion (step S207). In this way, the fluctuation torque gain G may be determined in consideration of the low-μ region α.

Next, some example effects of the vehicle 1 according to the present modification example will be described.

In some embodiments, when the low-μ region α has been detected, the fluctuation torque gain G to be applied to one or more of the motors M provided to corresponding one or more of the wheels T that are to pass through the low-μ region α may be set to a higher value than the fluctuation torque gain G to be applied to the remaining one or more of the motors M provided to corresponding one or more of the wheels T that are not to pass through the low-μ region α. Such a configuration helps to notify, at the early stage, the driver that the vehicle 1 is passing through the low-μ region α on the low-μ road such as the wet road, the snowy road, or the icy road, avoiding the occurrence of the slipping of the vehicle 1 to prevent the spinning and understeer of the vehicle 1. Therefore, the configuration helps to perform the torque control that copes with traveling on the low-μ road.

The effects described herein are merely exemplary, and effects of the disclosure are not limited to the effects described herein. Accordingly, any other effects may be achieved by any embodiment of the disclosure.

At least the following configurations are achievable from the foregoing example embodiment and its modification example of the disclosure.

(1) A vehicle control apparatus configured to control a vehicle, the vehicle including four wheels, and four motors provided to the respective four wheels, the vehicle being configured to travel by independently driving the motors, the vehicle control apparatus including a control processor configured to acquire target torques of the respective wheels by adding fluctuation torques of the respective wheels to requested torques of the respective wheels, the fluctuation torques each fluctuating cyclically, the requested torques corresponding to an accelerator operation amount, perform torque control of the motors, based on the target torques of the respective wheels, and when detecting that the vehicle is making a turn, set a first gain of each of the fluctuation torques to be applied to respective outer-wheel motors out of the four motors to a higher value than a second gain of each of the fluctuation torques to be applied to respective inner-wheel motors out of the four motors.

(2) The vehicle control apparatus according to (1), in which the control processor is configured to, when the vehicle has entered a corner and started to make the turn, set a third gain of the fluctuation torque to be applied to a front-outer-wheel motor out of the outer-wheel motors to a higher value than a fourth gain of the fluctuation torque to be applied to a rear-outer-wheel motor out of the outer-wheel motors, and when the vehicle is about to exit the corner and complete making the turn, set the fourth gain to a higher value than the third gain.

(3) The vehicle control apparatus according to (2), in which the control processor is configured to change the value of the third gain and the value of the fourth gain smoothly in accordance with a change in loads acting on respective outer wheels out of the four wheels.

(4) The vehicle control apparatus according to any one of (1) to (3), in which the control processor is configured to, when detecting that the vehicle is traveling straight, set each of gains of the fluctuation torques to be applied to the respective motors to a value greater than the second gain and less than the first gain.

(5) The vehicle control apparatus according to any one of (1) to (4), in which the control processor is configured to, when detecting a low-friction-coefficient region having a lower road-surface friction-coefficient value than a surrounding road surface, set the gain of the fluctuation torque to be applied to one or more of the motors provided to corresponding one or more of the wheels that are to pass through the low-friction-coefficient region to a higher value than the gain of the fluctuation torque to be applied to remaining one or more of the motors provided to corresponding one or more of the wheels that are not to pass through the low-friction-coefficient region.

In the vehicle control apparatus according to at least one embodiment of the disclosure, the target torques of the respective wheels are acquired by adding the fluctuation torques of the respective wheels that each fluctuate cyclically to the requested torques of the respective wheels that correspond to an accelerator operation amount, and the torque control of the motors is performed based on the target torques of the respective wheels. At this time, when the vehicle has been detected to be making the turn, each of the gains of the fluctuation torques to be applied to the respective outer-wheel motors out of the four motors is set to a higher value than each of the gains of the fluctuation torques to be applied to the respective inner-wheel motors out of the four motors. Such a configuration, when the vehicle is traveling through a curve, applies the target torques having larger vibration amplitudes to the motors of the outer wheels on which higher loads are acting than on the inner wheels, and applies the target torques having smaller vibration amplitudes to the respective motors of the inner wheels on which lower loads are acting than on the outer wheels. This helps to notify, at an early stage, a driver who drives the vehicle of a decrease in grip of the outer wheels on a low-friction-coefficient road (a low-μ road) such as a wet road, a snowy road, or an icy road, avoiding an occurrence of slipping of the vehicle to prevent spinning and understeer of the vehicle. According to at least one embodiment of the disclosure, it is thus possible to perform torque control that copes with curve traveling.

Although the disclosure has been described hereinabove in terms of the example embodiment and modification examples, the disclosure is not limited thereto. It should be appreciated that variations may be made in the described example embodiment and modification examples by those skilled in the art without departing from the scope of the disclosure as defined by the following claims.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a", "an", and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. does not denote any order or importance, but rather the terms first, second, etc. are used to distinguish one element from another.

The term "substantially", "approximately", "about", and its variants having a similar meaning thereto are defined as being largely but not necessarily wholly what is specified as understood by one of ordinary skill in the art.

The term "disposed on/provided on/formed on" and its variants having a similar meaning thereto as used herein refer to elements disposed directly in contact with each other or indirectly by having intervening structures therebetween.

The control processor 30 illustrated in FIGS. 1 and 9 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control processor 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control processor 30 illustrated in FIGS. 1 and 9.

The invention claimed is:

1. A vehicle control apparatus configured to control a vehicle, the vehicle comprising four wheels, and four motors provided to the respective four wheels, the vehicle being configured to travel by independently driving the motors, the vehicle control apparatus comprising a control processor configured to acquire target torques of the respective wheels by adding fluctuation torques of the respective wheels to requested torques of the respective wheels, the fluctuation torques each fluctuating cyclically, the requested torques corresponding to an accelerator operation amount, perform torque control of the motors, based on the target torques of the respective wheels, and when detecting that the vehicle is making a turn, set a first gain of each of the fluctuation torques to be applied to respective outer-wheel motors out of the four motors to a higher value than a second gain of each of the fluctuation torques to be applied to respective inner-wheel motors out of the four motors.

2. The vehicle control apparatus according to claim 1, wherein the control processor is configured to, when the vehicle has entered a corner and started to make the turn, set a third gain of the fluctuation torque to be applied to a front-outer-wheel motor out of the outer-wheel motors to a higher value than a fourth gain of the fluctuation torque to be applied to a rear-outer-wheel motor out of the outer-wheel motors, and when the vehicle is about to exit the corner and complete making the turn, set the fourth gain to a higher value than the third gain.

3. The vehicle control apparatus according to claim 2, wherein the control processor is configured to change the value of the third gain and the value of the fourth gain smoothly in accordance with a change in loads acting on respective outer wheels out of the four wheels.

4. The vehicle control apparatus according to claim 1, wherein the control processor is configured to, when detecting that the vehicle is traveling straight, set each of gains of the fluctuation torques to be applied to the respective motors to a value greater than the second gain and less than the first gain.

5. The vehicle control apparatus according to claim 1, wherein the control processor is configured to, when detecting a low-friction-coefficient region comprising a lower road-surface friction-coefficient value than a surrounding road surface, set the gain of the fluctuation torque to be applied to one or more of the motors provided to corresponding one or more of the wheels that are to pass through the low-friction-coefficient region to a higher value than the gain of the fluctuation torque to be applied to remaining one or more of the motors provided to corresponding one or more of the wheels that are not to pass through the low-friction-coefficient region.

6. The vehicle control apparatus according to claim 2, wherein the control processor is configured to, when detecting a low-friction-coefficient region comprising a lower road-surface friction-coefficient value than a surrounding road surface, set the gain of the fluctuation torque to be applied to one or more of the motors provided to corresponding one or more of the wheels that are to pass through the low-friction-coefficient region to a higher value than the gain of the fluctuation torque to be applied to remaining one or more of the motors provided to corresponding one or more of the wheels that are not to pass through the low-friction-coefficient region.

7. The vehicle control apparatus according to claim 3, wherein the control processor is configured to, when detecting a low-friction-coefficient region comprising a lower road-surface friction-coefficient value than a surrounding road surface, set the gain of the fluctuation torque to be applied to one or more of the motors provided to corresponding one or more of the wheels that are to pass through the low-friction-coefficient region to a higher value than the gain of the fluctuation torque to be applied to remaining one or more of the motors provided to corresponding one or more of the wheels that are not to pass through the low-friction-coefficient region.

8. The vehicle control apparatus according to claim 4, wherein the control processor is configured to, when detecting a low-friction-coefficient region comprising a lower road-surface friction-coefficient value than a surrounding road surface, set the gain of the fluctuation torque to be applied to one or more of the motors provided to corresponding one or more of the wheels that are to pass through the low-friction-coefficient region to a higher value than the gain of the fluctuation torque to be applied to remaining one or more of the motors provided to corresponding one or more of the wheels that are not to pass through the low-friction-coefficient region.

* * * * *